(12) United States Patent
Nagaishi et al.

(10) Patent No.: US 6,397,814 B1
(45) Date of Patent: Jun. 4, 2002

(54) APPARATUS AND METHOD FOR CONTROLLING INTAKE AIR QUANTITY FOR INTERNAL COMBUSTION ENGINE

(75) Inventors: Hatsuo Nagaishi; Keisuke Fujiwara, both of Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/299,098

(22) Filed: Apr. 26, 1999

(30) Foreign Application Priority Data

Apr. 27, 1998 (JP) .......................................... 10-117021

(51) Int. Cl.⁷ .......................... F02D 11/10; F02D 13/02
(52) U.S. Cl. ........................................................ 123/348
(58) Field of Search ................................. 123/345–348

(56) References Cited

U.S. PATENT DOCUMENTS

| 4,942,851 A | * | 7/1990 | Kawamura | ................ | 123/90.11 |
| 5,113,826 A | | 5/1992 | Anzai | ......................... | 123/403 |
| 5,115,782 A | | 5/1992 | Klinke et al. | ............... | 123/489 |
| 5,588,411 A | * | 12/1996 | Kreuter et al. | .............. | 123/348 |
| 5,771,858 A | | 6/1998 | Yoshida et al. | ............. | 123/306 |

FOREIGN PATENT DOCUMENTS

| DE | 197 00 104 | | 7/1997 |
| JP | 55087834 | | 3/1980 |
| JP | 55-87834 | | 7/1980 |
| JP | 5-71370 | * | 3/1993 |
| JP | 8-246823 | | 9/1996 |

* cited by examiner

Primary Examiner—Andrew M. Dolinar
(74) Attorney, Agent, or Firm—Foley & Lardner

(57) ABSTRACT

In a control apparatus and method for controlling an intake air quantity for an internal combustion engine, a throttle position of a throttle valve installed in an intake system of the engine is controlled in such a manner that an intake pressure around the throttle valve (pressure difference between upstream and downstream sides of the throttle valve or a ratio of a pressure between the upstream and downstream sides of the throttle valve) is maintained constant at an approximately predetermined negative pressure under a predetermined (low) engine load condition and a valve closure timing of at least one intake valve installed to open and close each corresponding combustion chamber of the engine is simultaneously controlled to regulate an intake air quantity supplied to the engine under the predetermined (low) engine load condition.

42 Claims, 11 Drawing Sheets

APPARATUS AND METHOD FOR CONTROLLING INTAKE AIR QUANTITY FOR INTERNAL COMBUSTION ENGINE

BACKGROUND OF THE INVENTION a) Field of the Invention

The present invention relates to control apparatus and method for an internal combustion engine and, more particularly, relates to intake air quantity controlling apparatus and method for the internal combustion engine which simultaneously control an opening angle of a throttle valve and a valve closure timing of an intake valve (each intake valve) according to an engine load condition.

b) Description of the Related Art

In an internal combustion engine in which an intake air quantity is controlled through a throttle valve, a loss in throttling around the throttle valve (called, a throttling loss) is involved and this causes a fuel consumption of the engine to be worsened.

To improve the fuel consumption, a variable valve driving apparatus has been proposed in which such a throttle valve as described above is eliminated and a valve closure timing of each intake valve is controlled so as to suck an appropriate quantity of intake air under the atmospheric pressure condition in an intake system of the engine, thus the intake air quantity control being controlled (refer to a Japanese Patent Application First Publication No. Heisei 8-246823 published on Sep. 24, 1996).

SUMMARY OF THE INVENTION

However, since no intake air negative pressure occurs in the intake system of the engine in such a variable valve driving apparatus as described in the BACKGROUND OF THE INVENTION having no throttle valve and the intake air quantity is regulated through the control over the closure timing of the intake valve(s), it is difficult to suck and process an EGR (Exhaust Gas Recirculation) gas, a purge of vaporized fuel from a canistor, a purge of a blow by gas within a crank casing into the intake system of the engine due to a presence in the intake air negative pressure.

It is therefore an object of the present invention to provide an intake air quantity control apparatus and method for an internal combustion engine in which valve closure timing of the intake valve(s) for each cylinder and an opening angle of the throttle valve (hereinafter also referred to as a throttle position of the throttle valve) are appropriately controlled so that an intake pressure having an appropriate magnitude is secured under a predetermined low engine load condition, the intake air quantity being controlled, so that a suction processing for the EGR gas, vaporized fuel, blow-bye gas, and so on utilizing the intake air negative pressure is carried out.

According to one aspect of the present invention, there is provided with a control apparatus for an internal combustion engine, comprising: a throttle valve installed in an intake system of the engine; at least one intake valve installed to open and close each corresponding combustion chamber of the engine; a throttle valve controller controlling a throttle position of the throttle valve in such a manner that an intake air negative pressure around the throttle valve is maintained constant at an approximately predetermined negative pressure value under a predetermined engine load condition; and an intake valve controller controlling a valve closure timing of the intake valve to regulate an intake air quantity supplied to the engine under the predetermined engine load condition.

According to another aspect of the present invention, there is provided with a method for controlling an intake air quantity of an internal combustion engine, comprising: controlling a throttle position of a throttle valve installed in an intake system of the engine in such a manner that an intake pressure around the throttle valve is maintained constant at an approximately predetermined negative pressure value under a predetermined engine load condition; and controlling a valve closure timing of at least one intake valve installed to open and close each corresponding combustion chamber of the engine to regulate an intake air quantity supplied to the engine under the predetermined engine load condition.

This summary of the invention does not necessarily describe all features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1A:
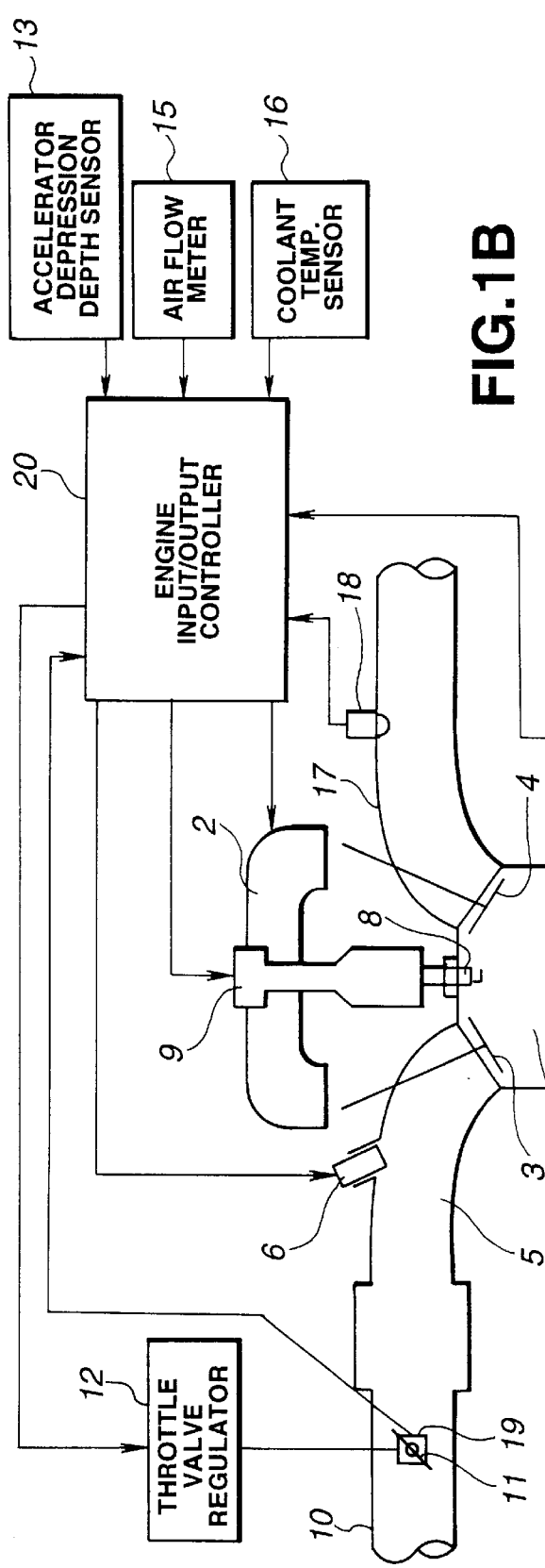
FIG. 1A is a schematic block diagram of an intake air quantity controlling apparatus in a first preferred embodiment according to the present invention.

FIG. 1A shows a first preferred embodiment of an intake air quantity controlling apparatus for an internal combustion engine 1 according to the present invention.

In FIG. 2A, an intake valve 3 and an exhaust valve 4 are attached onto the engine 1 whose valve lift and open/closure timings are electronically controlled through a valve drive 2. The valve drive 2 corresponds to an intake valve actuator defined in claims.

In an intake port of each cylinder, a fuel injector 6 is attached. In a combustion chamber 7 of each cylinder, an ignition coil 8 and an ignition coil 9 are installed.

In addition, a throttle valve 11 is interposed in an intake air passage 10 (intake system) of the engine 1 and a throttle valve regulator 12 is installed for electrically (and operatively) adjusting an opening angle (throttle position) of the throttle valve 11 (or called, throttle positioning) by means of a DC motor. In this embodiment, the throttle valve regulator 12 is constituted by the DC motor.

Each kind of sensors includes: an accelerator depression depth sensor 13 for detecting an opening angle of an accelerator pedal operated through a vehicle driver; a crank angle sensor 14 which generates a position signal for each unit of a crank angle of an engine crankshaft and a reference signal for each phase difference in a cylinder stroke; an airflow meter 15 which detects an intake air quantity of the engine 1; a coolant temperature sensor for detecting an engine coolant temperature of the engine 1; an air fuel mixture ratio sensor 18 installed in an exhaust passage 17 for detecting a specific component in the exhaust passage 17, e.g., by detecting a concentration of, e.g., oxygen ($O_2$); and a throttle position sensor 19 for detecting an opening angle of the throttle valve 11 of the engine 1.

The accelerator depression depth sensor correspond to an accelerator manipulated variable sensor detecting a manipulated variable of an accelerator.

Then, the number of the position signals per unit of time, the position signals being outputted from the crank angle sensor 14 or from a period of generation on the reference signal, an engine speed Ne can be determined.

An output signal from each kind of the sensors is outputted to an engine input/output controller 20 (or simply referred to as a controller).

The fuel injection signal is outputted to the fuel injection valve (fuel injector) 6 on the basis of these detection signals to perform a fuel injection control. An ignition signal is outputted to an ignition coil to perform a: an ignition control. Furthermore, a valve drive signal (control signal) is outputted to the valve drive 2 so that an open or closure of the intake valve(s) 3 and exhaust valve 4 is adjustably controlled. The opening angle of the throttle valve 11 is controlled by outputting a throttle valve drive signal from the engine input/output controller 20 to the throttle valve regulator 12.

Figure 1B:
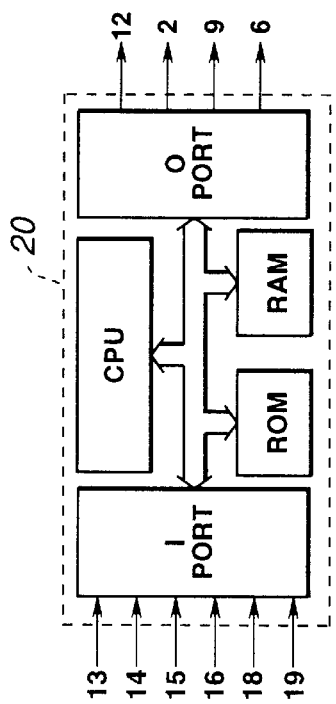
FIG. 1B is a circuit block diagram of an engine input/output controller shown in FIG. 1A.

It is noted that FIG. 18 shows a circuit configuration of the engine input/output controller 20. In FIG. 1B, the engine input/output controller includes a CPU (Central Processing Unit), a RAM (Random Access Memory), a ROM (Read Only Memory), an Input Port, an Output port, and a common bus.

Figure 2:
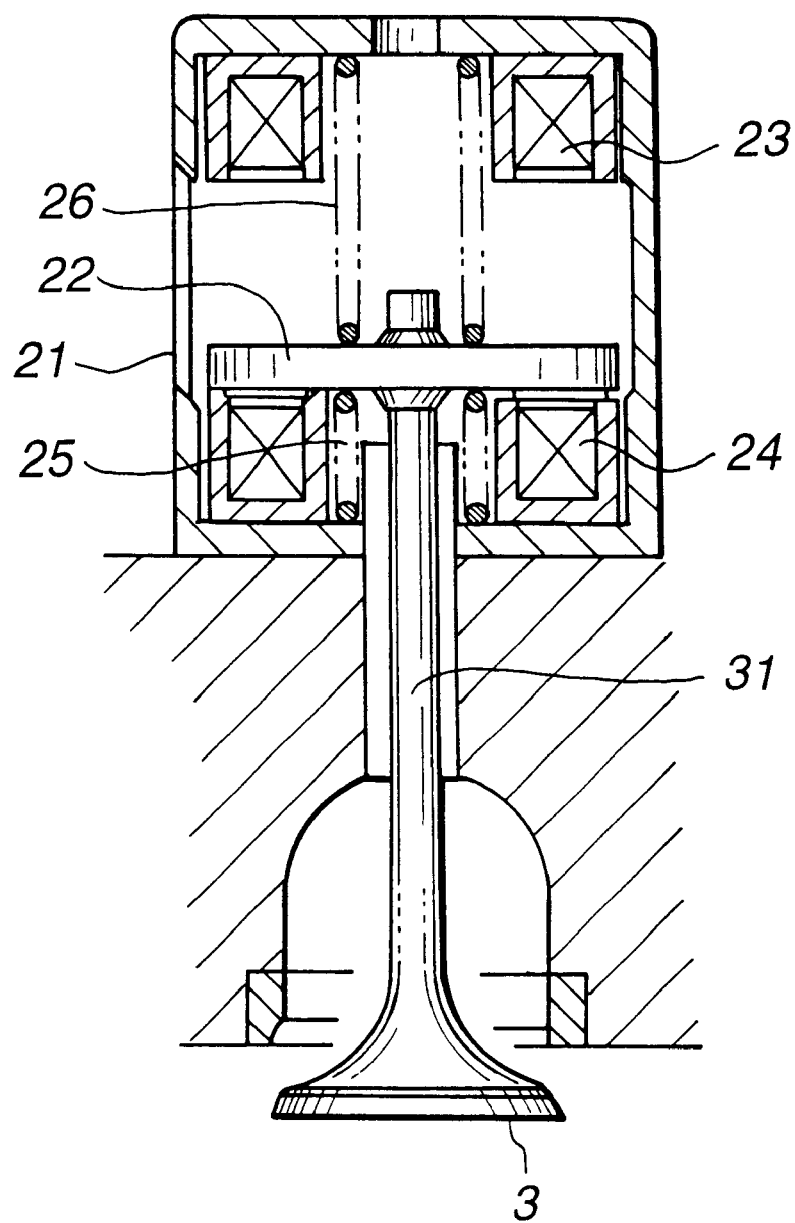
FIG. 2 is a cross sectional view of a representative valve drive in the first preferred embodiment shown in FIG. 1A.

FIG. 2 shows a configuration of the valve drive 2.

In FIG. 2, the valve drive 2 includes: a housing 21 made of a non-magnetic material and installed on a cylinder head; an armature 22 integrally installed on a stem 31 of the intake valve 3 (or exhaust valve 4, however, the intake valve 3 is herein represented); a valve closure electromagnet 23 fixedly arranged within the housing at a position opposing to an upper surface of the armature 22 and enabled to exhibit an electromagnetic force which attracts the armature 22 to close the corresponding intake valve 3; a valve opening electromagnetic 24 fixedly arranged within the housing 21 at a position opposing to a lower surface of the armature 22 so as to be enabled to exhibit the electromagnetic force which attracts the armature 22 toward an open direction of the corresponding intake valve 3; a valve closure return spring 25 which biases the armature 22 in the direction in which the intake valve 3 is closed; a valve open return spring 26 which biases the armature 22 in the valve open direction of the intake valve 3.

When both of the valve closure electromagnet 23 and the valve open electromagnet 24 are de-energized, spring forces between valve closure and valve opening springs 25 and 26 are set to be balanced to be placed at an approximately center position between fully open position and valve closure position of the corresponding intake valve 3. When only the valve closure electromagnet 23 is energized, the intake valve 3 is closed. When only the valve open electromagnet 24 is energized, the intake valve(s) 3 is driven to be opened (full open).

It is noted that the valve drive 2 is installed on each cylinder head of the engine 1 for each intake valve 3, the valve drive 2 may be installed for intake valves for each corresponding combustion chamber, and both magnets 23 and 24 of the valve drive 2 are connected to the engine input/output controller 20. It is also noted that the intake valve 3 means each intake valve.

A valve closure timing control of the valve drive 2 by means of the engine input/output controller 20 and a throttle positioning control via the throttle valve regulator 12 will hereinbelow be described.

Figure 3:
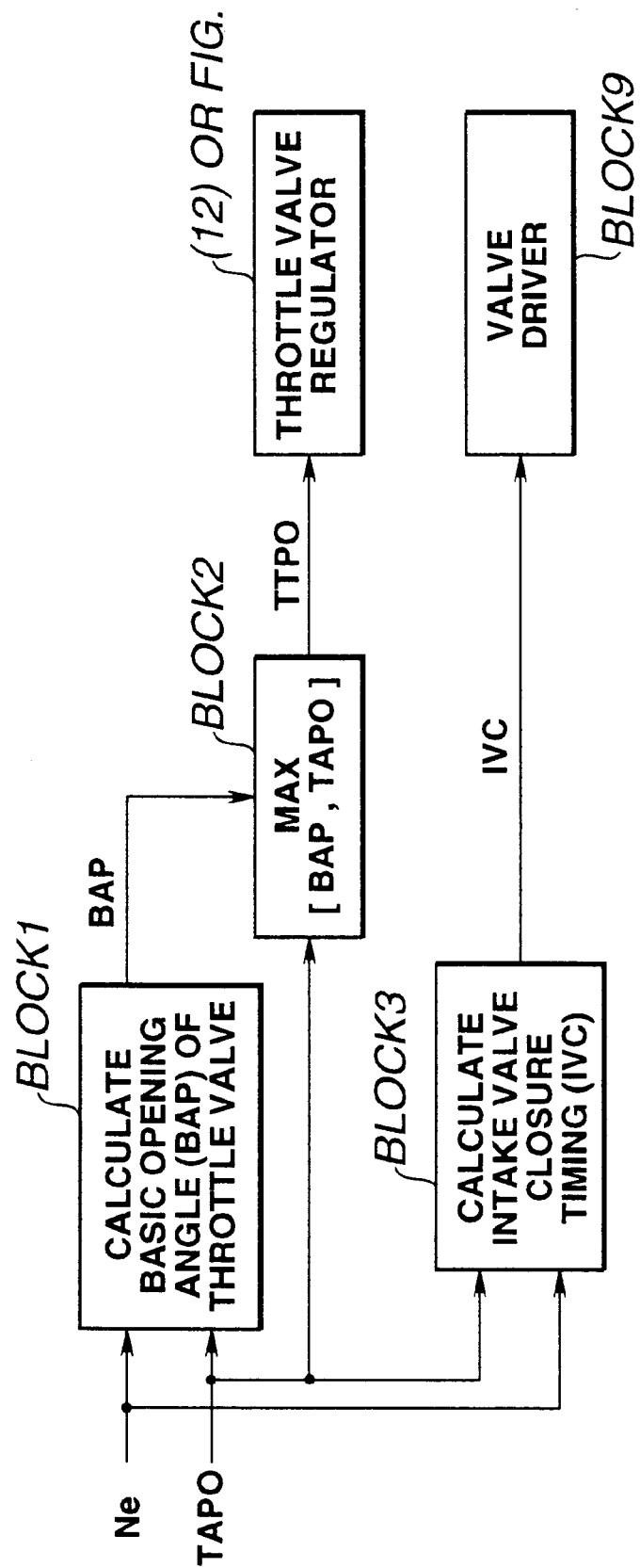
FIG. 3 is a functional block diagram for explaining an operation in the first preferred embodiment shown in FIG. 1A.

FIG. 3 is a control block diagram for explaining an operation of the first embodiment.

That is to say, at a first block BLOCK 1, the CPU of the controller 20 receives a value TAPO of the opening angle of the throttle valve which corresponds to the accelerator depression depth detected by the accelerator depression depth sensor 13 and the engine speed Ne detected on the basis of the signal from the crank angle sensor 14 to derive a basic opening angle (also called a basic throttle position) BAP of the throttle valve 11.

It is noted that the value of TAPO is also referred to as the throttle position of the throttle valve 11 corresponding to the manipulated variable of the accelerator.

At a second block BLOCK 2, the controller 20 selects one of either the basic opening angle BAP or the accelerator depression depth corresponding throttle valve opening angle TAPO which is larger than the other and controls the opening angle of the throttle valve 11 to become a target opening angle (a target throttle position) TTPO On the other hand, at a block BLOCK 3, the controller 20 receives the engine speed Ne and the acceleration depression depth corresponding throttle valve opening angle TAPO to calculate a target valve closure timing IVC of the intake valve 3 which meets with the target intake air quantity so as to control the valve closure timing of the intake valve 3.

Figure 4:
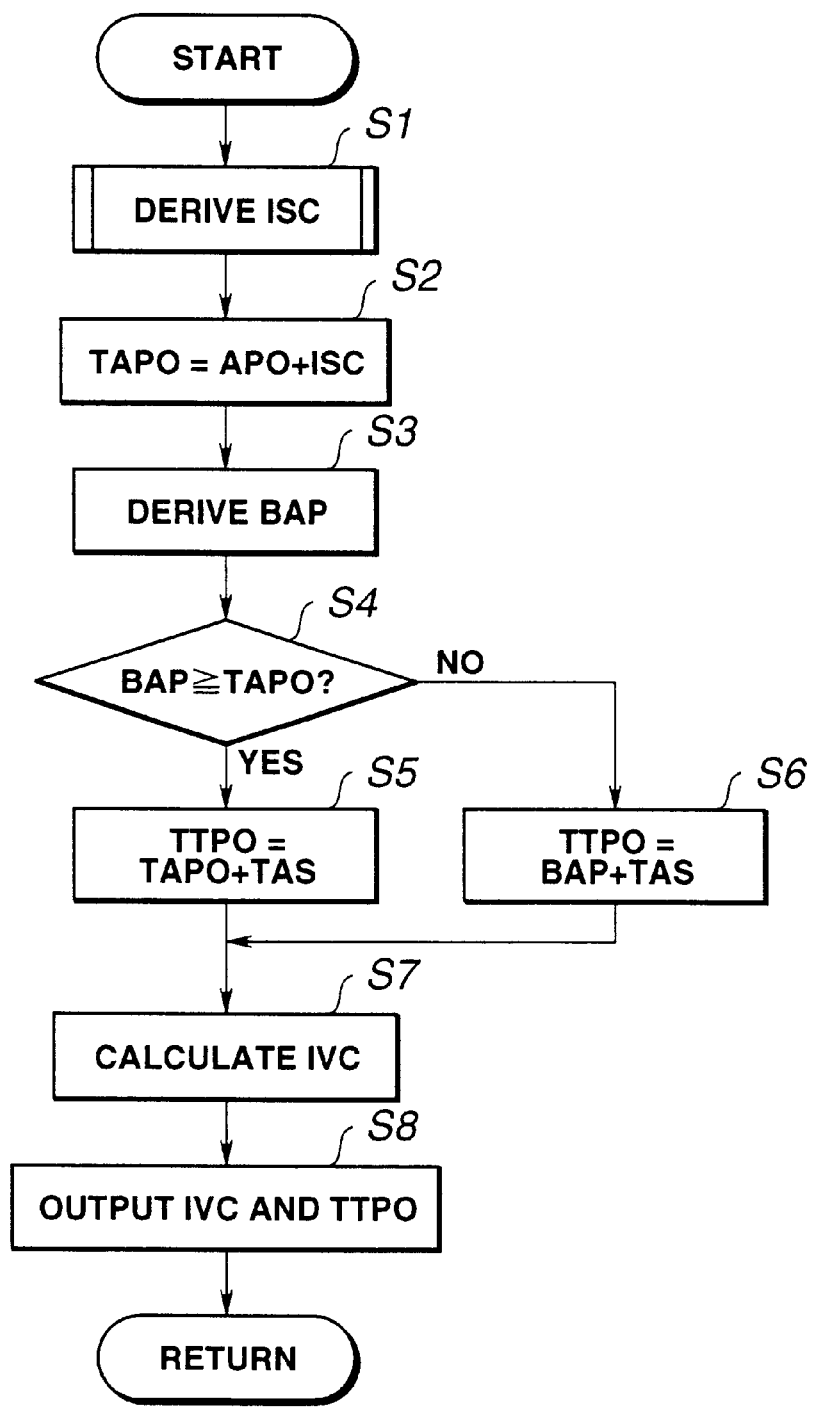
FIG. 4 is an operational flowchart on a detailed intake air control routine in the first preferred embodiment shown in FIG. 2.

FIG. 4 shows a detailed control flowchart executed by the engine input/output controller 20 in the first preferred embodiment according to the present invention.

At a step S1, the CPU of the controller 20 calculates an idling speed control component ISC related to the opening angle of the throttle valve 11.

Specifically, when the CPU of the engine input/output controller determines that the engine 1 falls in an engine idling state, the value of engine idling speed control component ISC is calculated so as to give an addition of a feedback control value and an engine accessory load correction value so that the engine idling speed is made equal to a target value of the engine idling speed.

When the CPU of the controller 20 determines that the engine falls in an engine non-idling state, the CPU is of the controller 20 selects one of either an addition of a fixed value of a feedback control correction value, the engine accessory load correction value (a correction value on an engine accessory load such as a vehicular air conditioner), and a correction value on a dash pot or a value on a BCV (Boost Control Valve) set so that an intake air negative pressure is held to be equal to or below a predetermined value which is larger than the other.

At a step S2, the CPU of the controller 20 calculates the accelerator depression depth corresponding throttle opening angle TAPO which is the addition of the accelerator depression depth APO detected by the accelerator depression depth sensor 13 and the idling speed control component ISC.

Figure 5A:
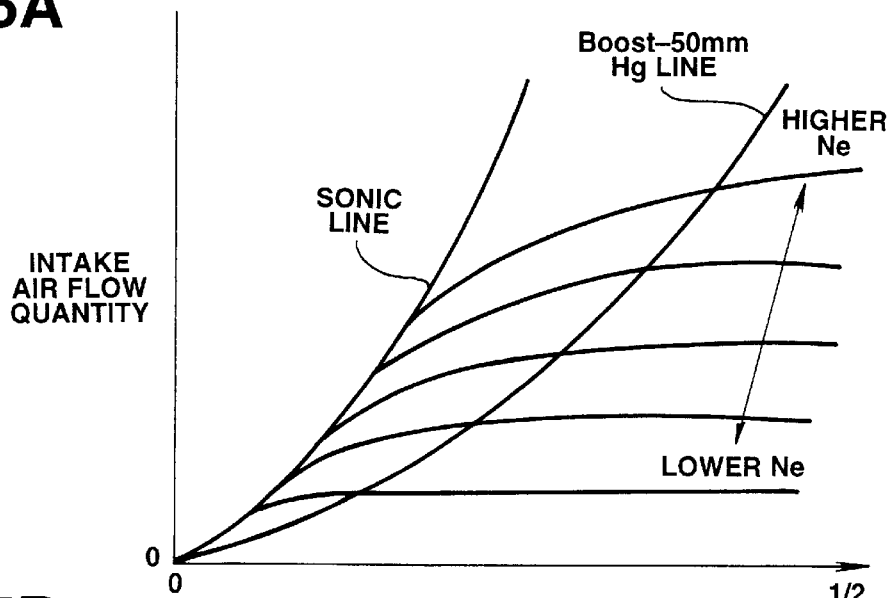
FIGS. 5A and 5B are integrally a table map representing characteristic graphs of a accelerator depression depth corresponding throttle valve opening angle TAPO and an intake air quantity with respect to a basic opening angle BAP of a throttle valve.
Figure 5B:
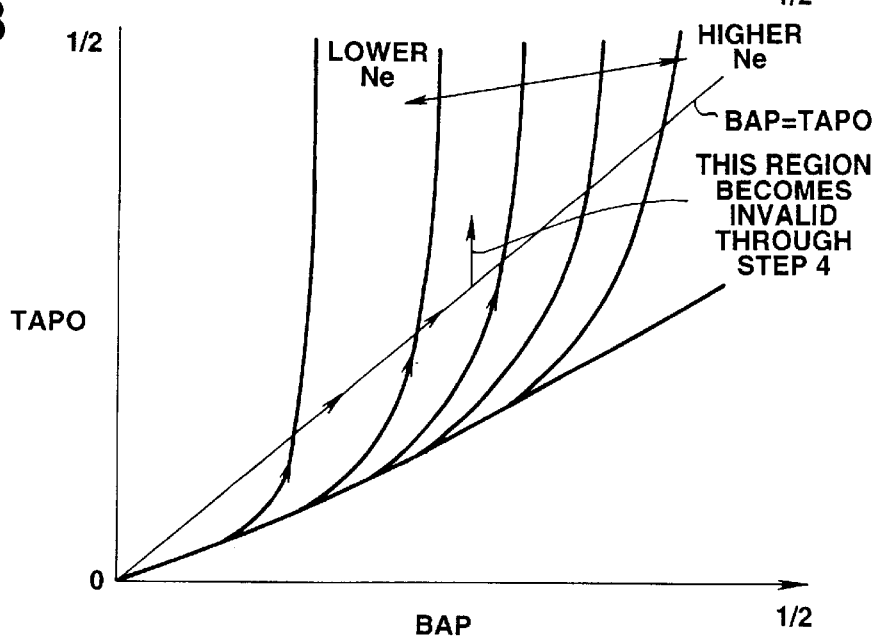

At a step S3, the CPU of the controller 20 calculates the basic opening angle BAP of the throttle valve according to a search from a map as shown in FIG. 5B on the basis of the accelerator depression depth corresponding throttle opening angle TAPO and the engine speed Ne.

It is noted that the basic opening angle BAP is calculated as the opening angle of the throttle valve which maintains the intake air negative pressure at an approximately predetermined negative pressure value, i.e., −50 mmHg.

At the subsequent step S4, the CPU of the controller 20 selects one of either the basic opening angle BAP or the accelerator depression depth corresponding throttle opening angle TAPO which is (equal to or) larger than the other.

If the basic opening angle BAP is selected at the step S4 (BAP≧TAPO (yes)), the routine goes to a step S5. At the step S5, the CPU of the controller 20 adds a learning value TAS on operations of the throttle valve 11 and the throttle valve opening angle sensor 19 for their long term uses such as an offset of the throttle valve opening angle sensor 13 and a clogging of some foreign matters on the throttle valve 11 to the basic opening angle BAP as a target opening angle TTPO of the throttle valve 11 (TTPO=BAP+TAS).

On the other hand, if the accelerator depression depth corresponding throttle valve opening angle TAPO is selected (BAP<TAPO, No) at the step S4, the routine goes to a step S6 in which the CPU of the controller 20 adds the accelerator depression depth corresponding throttle valve opening angle TAPO to the learning value TAS as the target opening angle TTPO (TTPO=TAPO+TAS).

At the step S7, the CPU of the controller 20 calculates a target valve closure timing IVC of the intake valve 3.

Figure 6:
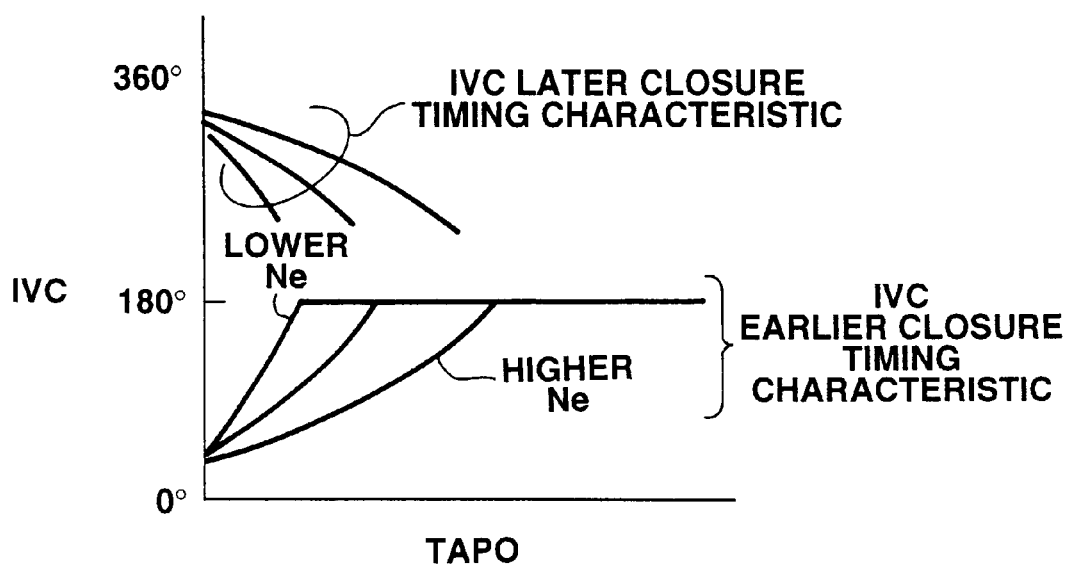
FIG. 6 is a characteristic graph representing a target valve closure timing at which the intake valve is closed.

Specifically, the CPU of the controller 20 searches the value (in degree of angle) of the target valve closure timing IVC on the basis of the accelerator depression depth corresponding angle TAPO and the engine speed Ne from a table map as shown in FIG. 6. It is noted that FIG. 6 shows the map table representing an earlier valve closure timing characteristic at which the intake valve 3 is closed before a bottom dead center of a piston at a suction stroke of each corresponding cylinder and a later valve closure timing characteristic at which the intake valve 3 is closed after the bottom dead center of the piston at the suction stroke. It is noted that, in FIG. 6, 0° corresponds to an upper top dead center at the suction stroke and 180° corresponds to the bottom top dead center It is also noted that the target valve closure timing IVC of the intake valve 3 is calculated so that a target intake air quantity which meets with a target engine torque corresponding to an engine driving situation determined on the basis of the accelerator depression depth corresponding throttle valve opening angle TAPO and the engine speed Ne. However, if the intake air negative pressure when the basic opening angle BAP is selected at the step S4 is maintained at the predetermined value (−50 mmHg), the target closure timing IVC is set to be varied up to a range at which the intake air quantity becomes maximum, the opening angle of the throttle valve 11 being maintained below a predetermined opening angle.

On the other hand, if the intake air negative pressure when the accelerator depression depth corresponding throttle valve opening angle TAPO is selected at the step S4 is equal to or below the predetermined negative pressure value, a target valve closure timing IVC is fixed at a timing at which the intake air quantity gives maximum, namely, at an angular position corresponding to the bottom top dead center at the suction stroke and an increasing control of the intake air quantity is carried out through the opening angle control of the throttle valve 11 via the throttle valve regulator 12.

Then, at the next step S8, the CPU of the controller 20 outputs the target opening angle TTPO of the throttle valve 11 and the target valve closure timing IVC of the intake valve 3 as the corresponding control signals to the throttle valve regulator 12 and the valve drive 2, respectively.

Hence, according to the output signals of the engine input/output controller 20, the opening angle of the throttle valve 11 is adjusted to give the target opening angle TTPO and the valve closure timing of the intake valve 3 as the corresponding control signals is adjusted to give the target valve closure timing IVC.

Figure 7:
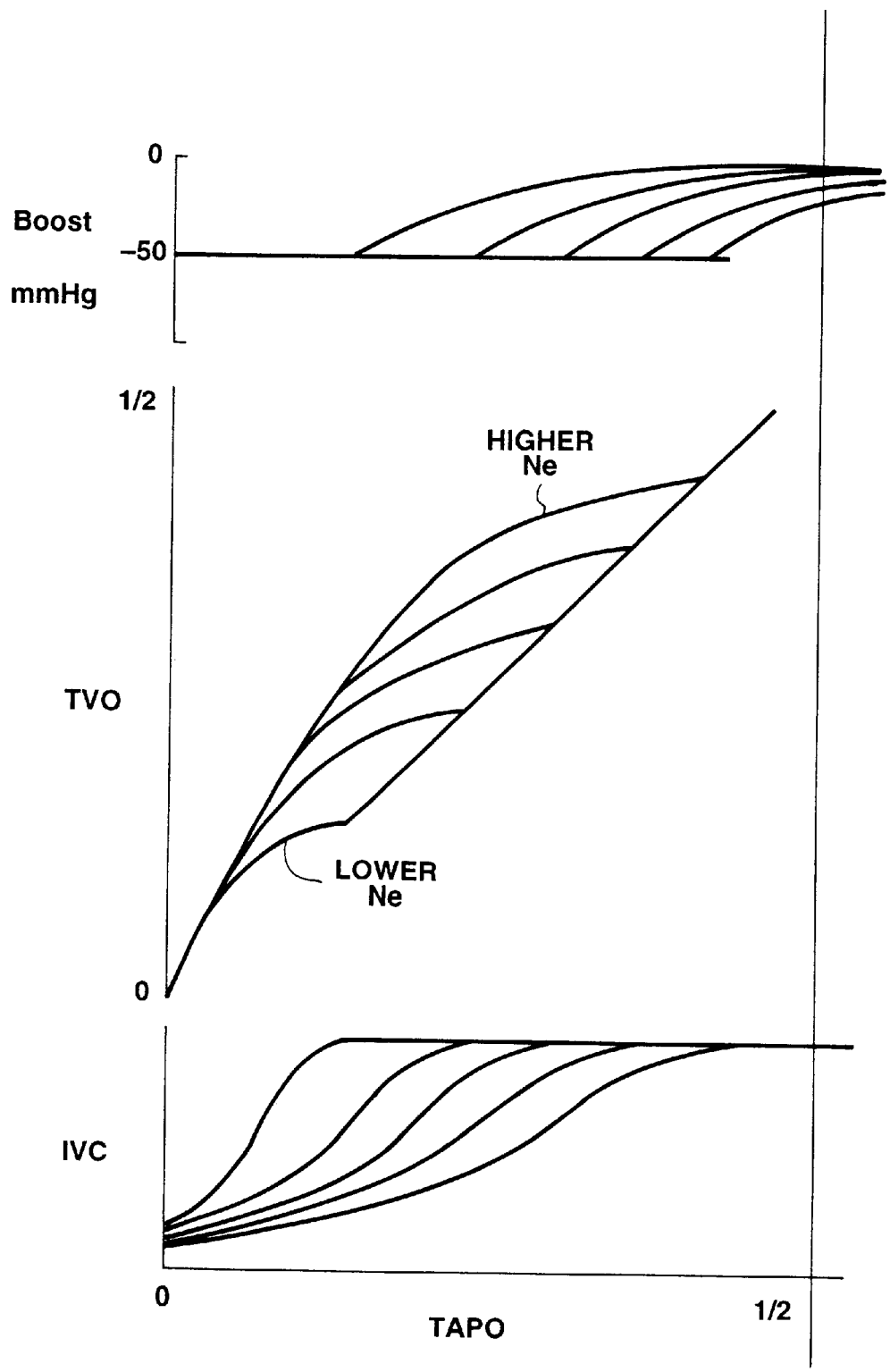
FIG. 7 is an integrally characteristic graph representing each variable of an engine operation in the first preferred embodiment.

FIG. 7 shows characteristics of the valve closure timing IVC, the opening angle of the throttle valve TVO, the intake air negative pressure (Boost) with respect to the accelerator depression depth corresponding throttle valve opening angle TAPO when the intake air quantity control described in the first embodiment is executed in accordance with the flowchart of FIG. 4.

In FIG. 7, ½ denotes a half angle between the full open position 1 and the full close position 0.

It is noted that the intake air negative pressure around the throttle valve 11 includes the difference in pressure (a ratio in pressure) between the upstream and downstream sides of the throttle valve 11.

Under a predetermined low engine load condition, the opening angle of the throttle valve 11 is controlled so that an intake air negative pressure, namely, a difference in pressure between upstream and downstream sides of the throttle valve 11 is maintained at approximately predetermined negative pressure value.

Hence, EGR, a purge of the vaporized fuel from the canistor, and a purge of the blow-bye gas from the crankshaft casing utilizing the intake negative pressure can be executed without trouble.

Even if the engine 1 falls in the predetermined low load condition, a throttling loss in the throttle valve 11 is retained at minimum with the intake air negative pressure maintained below the predetermined pressure value so that the fuel consumption can be improved.

Figure 8:
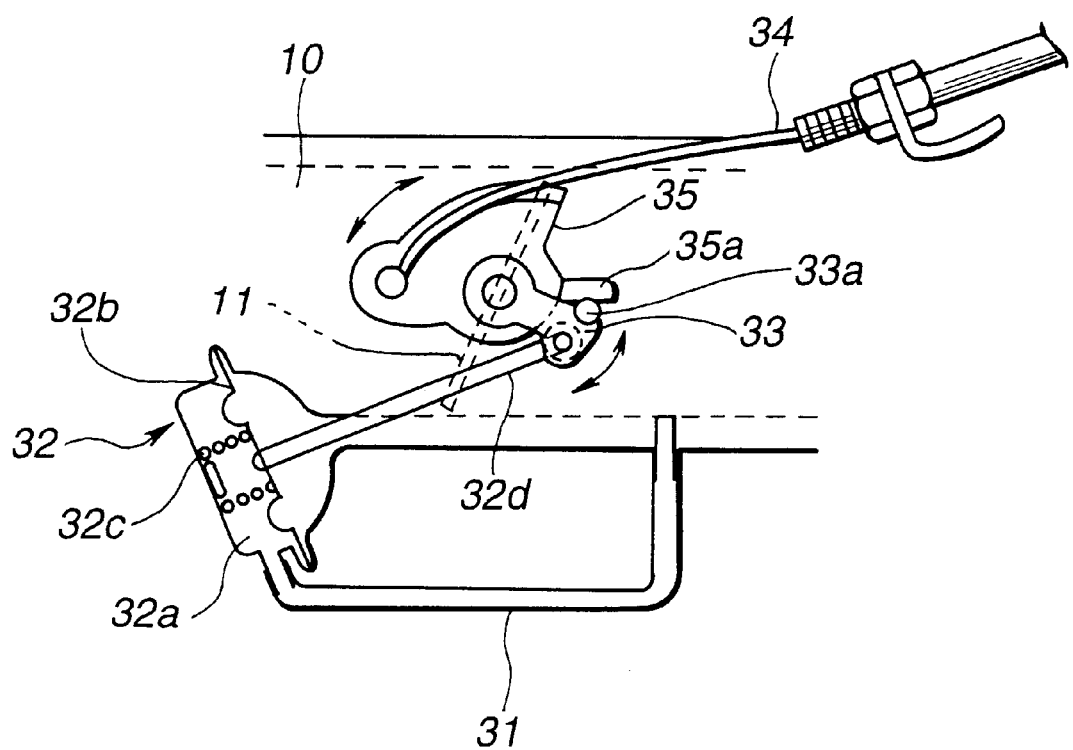
FIG. 8 is a side view of explaining a (mechanical) throttle valve controller in a second preferred embodiment according to the present invention.

FIG. 8 shows a second preferred embodiment of the intake air quantity controlling apparatus according to the present invention.

In the second preferred embodiment, the function of the throttle valve opening angle control carried out by the engine input/output controller 20 and the throttle valve regulator 12 is achieved by means of a mechanical throttle valve controller as will be described below.

The same reference numerals as those in FIG. 1A are used for the like elements described in the second embodiment. The other structure of the second embodiment is the same as described in the first embodiment.

In FIG. 8, a negative pressure hose 31 is provided on a part of the intake air passage 10 which is located at the downstream side of the throttle valve 11 (toward the intake valve side).

An intake air negative pressure taken out of the part of the intake air passage 10 via the hose 31 is introduced into a pressure operation chamber (a negative pressure chamber) 32a of a negative pressure actuator 32 in a diaphragm structure.

A compression spring 32c is interposed between a casing wall and a diaphragm portion 32b of the pressure operation chamber 32a. An end portion of the rod 32d linked with the diaphragm portion 32b is axially supported on a swingable end portion of the lever 33 so as to be in a freely and relatively rotatable state.

An accelerator drum 35 is linked via an accelerator wire 34 to the accelerator pedal (not shown) of the vehicle and is axially supported on a rotary axle of the throttle valve 11 denoted by a broken line of FIG. 8.

An engagement pawl 35a formed on the accelerator drum 35 is linkably and movably contacted on a stopper axle 33a fixed on an end edge of the lever 33 according to the movement of the accelerator drum 35 in the same direction as the throttle valve 11 which is in the open direction thereof.

An action of the mechanical throttle valve controller in the second embodiment will be described below.

The negative pressure in the diaphragm-type negative pressure actuator 32 causes the compression spring 32c to be compressed so that the rod 32d is pulled to be introduced toward the compressed spring 32c when the intake air negative pressure at the downstream side of the throttle valve 11 is increased in the negative direction and the opening angle of the throttle valve 11 is accordingly increased.

Hence, since the intake negative pressure is decreased in the positive direction, the negative pressure actuator 32 has the function of retaining the intake air negative pressure constantly at approximately the predetermined negative value (−50 mmHg).

On the other hand, when, in the accelerator drum 35, the engagement pawl 34a is linked to the stopper axle 33a when the accelerator depression depth is increased up to a vicinity to the present opening angle of the throttle valve 11 at the time when the negative pressure actuator 32 causes the intake air negative pressure to be held constantly at the approximately predetermined pressure value (−50 mmHg). If the accelerator depression depth is increased more, the rod 32d of the negative pressure actuator 32 being pulled toward the negative pressure chamber 32a against the biasing force of the compression spring 32c and, at the same time, the throttle valve 11 being forced to open through an angular position which corresponds to the accelerator depression depth.

Hence, under such the predetermined low engine load condition such that the accelerator depression depth is equal to or below a predetermined low angular depth value, the opening angle of the throttle valve 11 is controlled so that the intake air negative pressure is maintained constant at the approximately predetermined negative pressure value. On the other hand, under such a high engine load condition that the accelerator depression depth is in excess of the predetermined angular depth value, the opening angle of the throttle valve 11 is incrementally controlled regardless of the negative pressure actuator Furthermore, the valve closure timing of the intake valve 3 is controlled up to giving the valve closure timing at which the intake air quantity gives maximum until the accelerator depression depth indicates the predetermined angular valve, namely, at which the piston has reached to the bottom top dead center at the suction stroke.

Under the predetermined high engine load condition such as exceeding the accelerator predetermined depression depth angle, the valve closure timing is controlled to be fixed to the bottom dead center at the suction stroke.

In the way described above, the throttle valve controller as shown in FIG. 8 can achieve the same function as the engine input/output controller 20 and the throttle valve regulator 12 described in the first embodiment have with a simple construction and a low cost without the throttle valve regulator 12.

Next, a third preferred embodiment of the intake air quantity controlling apparatus according to the present invention will be described below.

In the third embodiment, the intake air quantity is controlled according to the closure timing of the intake valve(s) not only during the predetermined low engine load condition but also during the predetermined high engine load condition.

Figure 9:
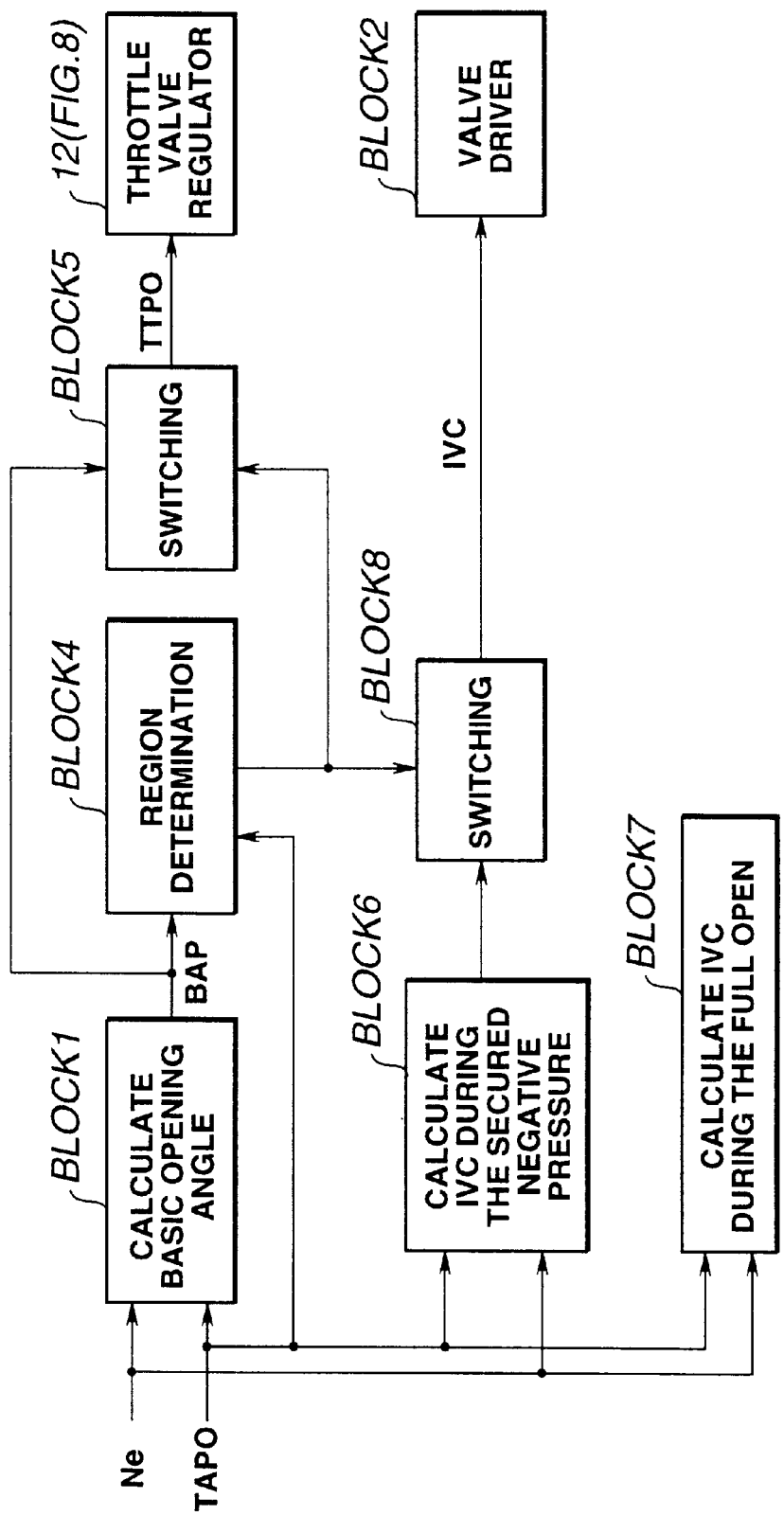
FIG. 9 is a functional block diagram for explaining an operation in the case of a third preferred embodiment of the intake air quantity control apparatus according to the present invention.

FIG. 9 shows a control block diagram in a third preferred embodiment of the intake air quantity controlling apparatus according to the present invention.

At the block BLOCK1 shown in FIG. 9, the controller 20 calculates the basic opening angle BAP of the throttle valve 11 by the search of the map shown in FIGS. 5A and 5B on the basis of the accelerator pedal depression depth corresponding throttle valve opening angle TAPO and the engine speed Ne.

Figure 10:
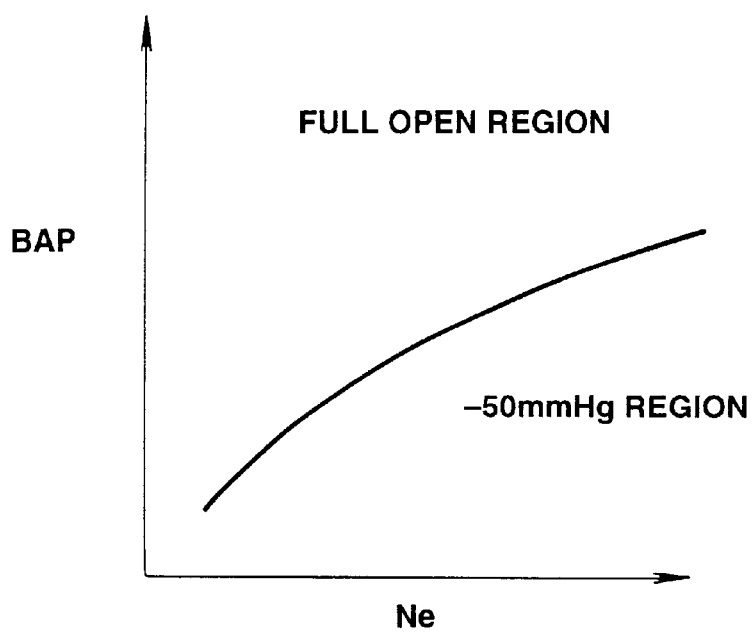
FIG. 10 is an integrally characteristic graph of two regions determined at a block BLOCK4 shown in FIG. 9 in the case of the third preferred embodiment.

At the block BLOCK4 shown in FIG. 9, the controller 20 selectively determines one of two of first and second regions from the search of a map shown in FIG. 10 on the basis of the basic opening angle BAP and the engine speed Ne, the first region being a region in which the intake air negative pressure is maintained at the approximately negative pressure value (−50 mmHg) and the second region in which the throttle valve 11 is in a full open state, namely, the intake air pressure is at the atmospheric pressure.

At the block BLOCK5 shown in FIG. 9. the controller 20 outputs the control signal TTPO to the throttle valve regulator 12 on the basis of the determination result on the selected region at the block BLOCK4. The content of the control signal is set to maintain the intake negative pressure under the approximately predetermined pressure (−50 mmHg) in a case where one of the regions in which the intake air negative pressure is maintained under the approximately predetermined pressure (−50 mmHg). The content of the control signal is set to force the throttle valve 11 to the full open state in the case of the other region in which the throttle valve is determined to be in the full open state.

Figure 11:
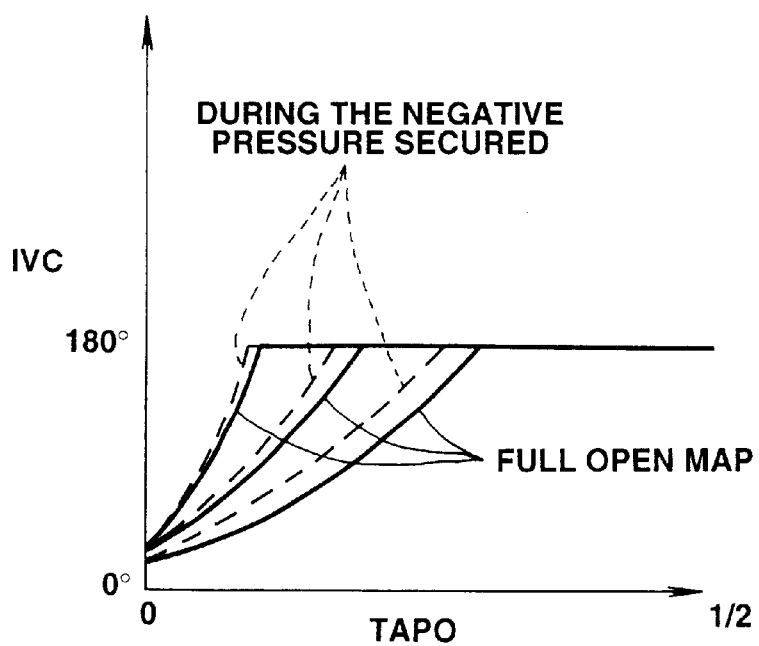
FIG. 11 is a map representing a target valve closure timing IVC used in the third embodiment.

At the block BLOCK6 shown in FIG. 9, the controller 20 calculates the valve closure timing IVC of the intake valve 3 in the region in which the intake air negative pressure is maintained under the approximately predetermined pressure (−50 mmHg) by the search of the map of a characteristic denoted by a bold dot line in FIG. 11.

At the block BLOCK7 shown in FIG. 9, the controller 20 calculates the valve closure timing IVC of the intake valve(s) 3 in the region in which the throttle valve 3 in the region in which the throttle valve is in the full open state according to the search in the map having the characteristic denoted by the solid line of FIG. 11 on the basis of the accelerator depression depth corresponding throttle valve opening angle TAPO and the engine speed Ne.

At the block BLOCK8 shown in FIG. 9, the controller 20 outputs the control signal on the valve closure timing of the intake valve 3 to the valve drive 2 set so as to correspond to one of the two regions, the one region (first region) being the region in which the intake air pressure is maintained at the approximately predetermined negative pressure value(−50 mmHg) and the other region (second region) being the region in which the throttle valve is forced into the full open state.

Figure 12:
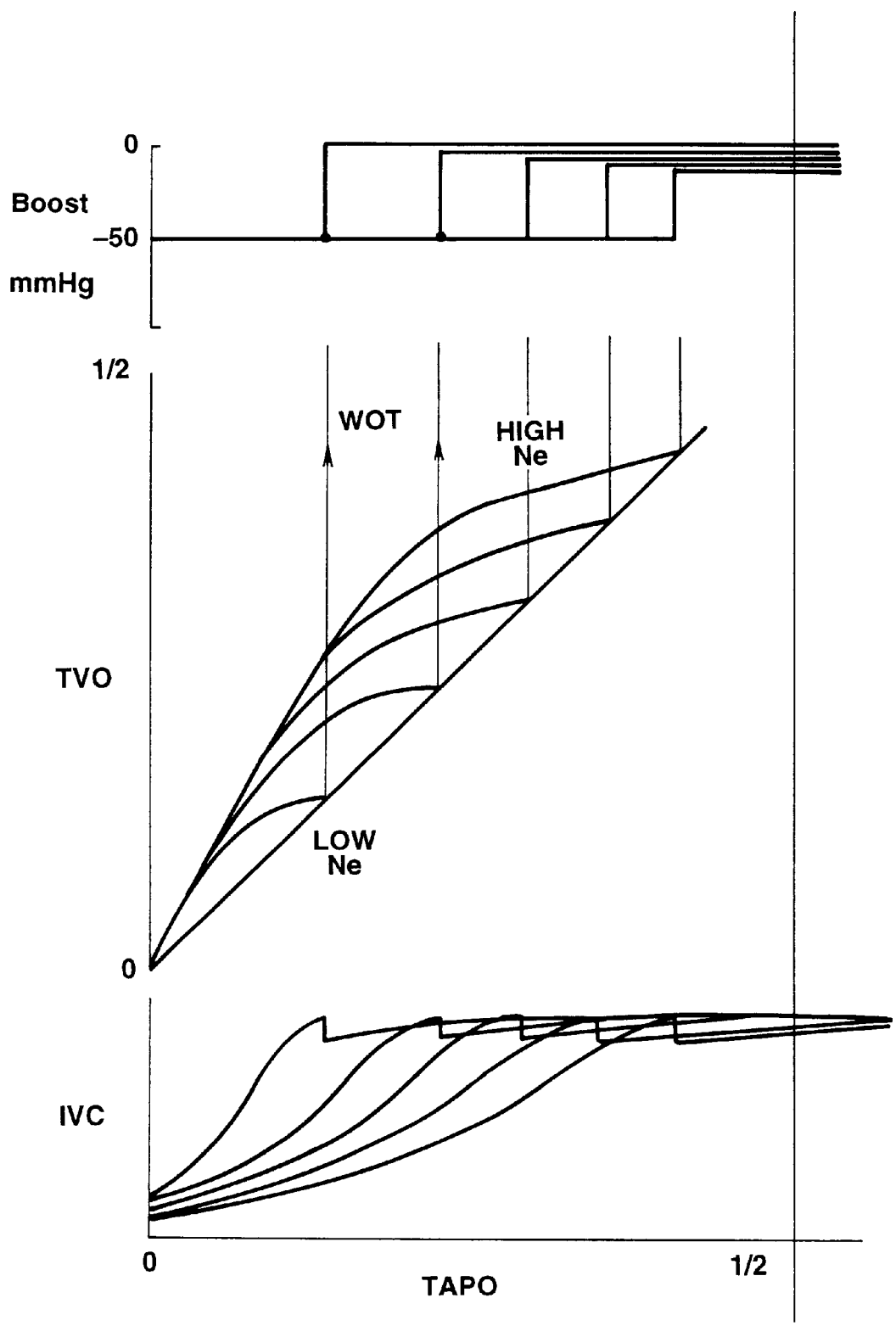
FIG. 12 is an integrally characteristic graph representing each variable of the engine as a result of control carried out in the third embodiment shown in FIG. 9.

FIG. 12 shows the characteristic graphs of the intake air negative pressure (Boost) with respect to the engine speed Ne, the throttle valve opening angle TVO with respect to the accelerator depression depth corresponding throttle valve opening angle TAPO and the intake valve closure timing IVC when the above-described procedure of control in the third embodiment is executed.

In the same manner as the first embodiment, the intake air negative pressure is maintained under approximately predetermined pressure value under the predetermined low load condition shallower than the predetermined accelerator depression depth angle so that the EGR, the purge of the vaporized fuel from the canistor, and the purge of the vaporized fuel from the canistor, and the purge of the blow-bye gas from the crank casing utilizing the negative pressure can be executed without trouble.

In addition, even under the predetermined low engine load condition, the intake air negative pressure is prevented from becoming larger than the predetermined negative pressure value 4 so that the throttling loss of the throttle valve is held at minimum and the fuel consumption can be improved.

Furthermore, as compared with the first embodiment, the control becomes rather complex. However, even under the predetermined high load condition, the intake air quantity is controlled through the valve closure timing of the intake valve 3. As compared with the intake air quantity control through the opening angle of the throttle valve, a highly accurate intake air quantity control having a high responsive characteristic can be achieved under the approximately constant condition of the intake air pressure due to a control of the intake air quantity in a vicinity to the engine cylinder.

In FIG. 12, WOT is an abbreviation for a Wide Open Throttle.

It is noted that a sonic line shown in FIG. 5A indicates a boundary of the intake negative pressure above which the intake air negative pressure does not occur and any value indicated by an arrow line denoted by THIS REGION BECOMES INVALID THROUGH STEP 4 in FIG. 5B is cut out at the step S4 shown in FIG. 4.

It is also noted that since under the predetermined low engine load condition the difference in pressure between the upstream and downstream sides of the throttle valve 11 is present and under the predetermined high engine load condition the difference described above is not present, the engine input/output controller 20 may not specifically determine whether the engine falls in the predetermined low engine load condition or in the predetermined high engine load condition. However, in the third embodiment, according to the basic opening angle BAP and the engine speed Ne, the engine input/output controller 20 determines in which region as shown in FIG. 10 the throttle valve opening angle and the valve closure timing of the intake valve are to be controlled.

The entire content of the Japanese Patent Application P10-117021 (filed on Apr. 27, 1998) is herein incorporated by reference.

Although the present invention has been described above by reference to certain embodiments of the present invention, the present invention is not limited to the embodiments described above. Modifications and variations of the embodiments described above will occur to those skilled in the air in the light of the above teachings.

What is claimed is:

1. A control apparatus for an internal combustion engine, comprising:
    a throttle valve installed in an intake system of the engine;
    at least one intake valve installed to open and close each corresponding combustion chamber of the engine;
    a throttle valve controller controlling a position of the throttle valve in such a manner that an intake pressure downstream of the throttle valve is maintained constant at an approximately predetermined pressure value while the engine is operating under a predetermined low engine load condition; and
    an intake valve controller which calculates a valve closure timing of the intake valve indicative of a target intake air quantity in accordance with an engine speed and an accelerator depression while the engine is operating under the predetermined low engine load condition.

2. A control apparatus for an internal combustion engine as claimed in claim 1, wherein the throttle valve controller controls the throttle position of the throttle valve in such a manner that the throttle valve is maintained at a closed position so as to block a flow of intake air therethrough while the intake valve controller controls the valve closure timing of the intake valve up to a range in which the intake air quantity becomes maximum under the predetermined low engine load condition and the throttle valve controller controls the throttle valve so as to enable a substantially full flow of intake air therethrough while the intake valve controller controls the valve closure timing of the intake valve in such a manner that the valve closure timing of the intake valve is maintained at a timing at which the intake air quantity becomes maximum.

3. A control apparatus for an internal combustion engine as claimed in claim 1, wherein the throttle valve controller comprises:
    a pressure actuator receiving the intake pressure downstream of the throttle valve to operate the throttle position of the throttle valve so that a difference in pressure between upstream and downstream sides of the throttle valve is maintained substantially constant under the predetermined low engine load condition; and
    an interlocking mechanism to interlock an accelerator manipulation with the throttle valve under a predetermined high engine load condition so that the throttle position of the throttle valve is controlled regardless of an operation of the pressure actuator.

4. A control apparatus for an internal combustion engine as claimed in claim 3, wherein the pressure actuator comprises:
    a diaphragm forming a part of a pressure operating chamber in which the intake pressure downstream of the throttle valve is introduced;

a compression spring disposed in the pressure operating chamber compressing the diaphragm; and an elongated rod whose one end thereof is linked to the diaphragm whose other end is axially supported on a lever linked on a rotary axle of the throttle valve; and wherein the interlocking mechanism comprises:

an accelerator drum linked to an accelerator wire and axially supported on the rotary axle of the throttle valve so as to enable the relative revolution to the throttle valve; and an engagement pawl formed on the accelerator drum which is freely linked to a stopper of the lever according to a motion of the rotation of the lever according to a motion of the rotation of the accelerator.

5. A control apparatus for an internal combustion engine as claimed in claim 1, wherein the throttle valve controller and the intake valve controller are constituted by a single engine input/output controller, wherein the single engine input/output controller calculates a basic throttle position BAP of the throttle valve according to a throttle position TAPO of the throttle valve corresponding to the manipulated variable APO of the accelerator and the engine speed Ne, determines whether the engine is in a first region or a second region on the basis of the basic throttle position BAP and the engine speed Ne, the first region being a region in which the intake pressure downstream of the throttle valve is maintained at the approximately predetermined negative pressure and the second region being a region in which the throttle position of the throttle valve is controlled to become a full open position.

6. A control apparatus for an internal combustion engine as claimed in claim 5, wherein the single engine input/output controller controls the throttle position of the throttle valve to the basic throttle position BAP via a throttle actuator when the engine is in the first region and the single engine input/output controller controls the throttle position of the throttle valve to the full open position of the throttle valve via the throttle actuator when the engine is in the second region.

7. A control apparatus for an internal combustion engine as claimed in claim 6, wherein the single engine input/output controller calculates the valve closure timing IVC of the intake valve on the basis of the throttle position TAPO when the engine is in the second region and outputs a control signal to an intake valve actuator, the control signal corresponding to the calculated valve closure timing IVC.

8. A control apparatus for an internal combustion engine comprising:

a throttle valve installed in an intake system of the engine;

at least one intake valve installed to open and close each corresponding combustion chamber of the engine;

a throttle valve controller to control throttle position of the throttle valve in such a manner that an intake pressure around the throttle valve is maintained constant at an approximately predetermined pressure value under a predetermined low engine load condition;

an intake valve controller to control valve closure timing of the intake valve to regulate an intake air quantity supplied to the engine under the predetermined low engine load condition; and an accelerator sensor to detect a manipulated variable of an accelerator, and wherein the throttle valve controller and the intake valve controller is constituted by a single engine input/output controller, and wherein the engine input/output controller:

calculates a basic throttle position BAP of the throttle valve according to the throttle position TAPO of the throttle valve which corresponds to the manipulated variable APO of the accelerator, selects a larger one of the basic throttle position BAP and the throttle position TAPO, controls the throttle position of the throttle valve in such a manner that the selected throttle position is set as a target throttle position TTPO, calculates a target valve closure timing IVC of the intake valve which corresponds to a target intake quantity, and controls the valve closure timing of the intake valve to the target closure timing IVC.

9. A control apparatus for an internal combustion engine as claimed in claim 8, wherein the engine input/output controller calculates the throttle position TAPO of the throttle valve which corresponds to the manipulated variable APO of the accelerator and an engine idling speed control component ISC.

10. A control apparatus for an internal combustion engine as claimed in claim 9, wherein the engine input/output controller determines whether the engine falls in an engine idling condition on the basis of the manipulated variable of the accelerator, calculates the engine idling speed control component ISC according to a feedback control value such that the engine idling speed becomes a target value and an engine accessory load correction value when the engine falls in the engine idling condition and according to a selection of one of an addition value of a fixed value of a feedback correction value, an engine accessory load correction value, and a dash pot correction value and a boost control value component BCV set to hold the intake air negative pressure at the approximately predetermined negative pressure which is larger than the other when the engine falls in an engine non-idling condition.

11. A control apparatus for an internal combustion engine as claimed in claim 10, wherein the engine input/output controller calculates the basic throttle angular position BAP according to a search of a map from the throttle position TAPO of the throttle valve corresponding to the manipulated variable of the accelerator and the engine speed Ne, the basic throttle angular position BAP being calculated as the throttle position of the throttle valve such that the intake air negative pressure is maintained at approximately predetermined negative pressure.

12. A control apparatus for an internal combustion engine as claimed in claim 11, wherein when the engine input/output controller selects the basic throttle angular position BAP, the engine input/output controller calculates the target throttle position TTPO of the throttle valve which is an addition of the basic throttle position BAP and a learning value TAS on operations of the throttle valve position sensor and the throttle valve and when the engine input/output controller selects the throttle position TAPO of the throttle valve which corresponds to the manipulated variable of the accelerator, the engine input/output controller calculates the target throttle position TTPO which is an addition of the throttle position TAPO of the throttle valve corresponding to the manipulated variable of the accelerator and the learning value TAS.

13. A control apparatus for an internal combustion engine as claimed in claim 12, wherein the engine input/output controller calculates the target valve closure timing IVC of the intake valve according to the throttle position TAPO of the throttle valve which corresponds to the manipulated variable of the accelerator and the engine speed Ne, the target valve closure timing IVC being calculated in such a manner that the target intake air quantity which meets with a target engine torque which corresponds to an engine driving condition determined on the basis of the throttle position TAPO of the throttle valve corresponding to the manipulated variable APO of the accelerator and the engine speed Ne, the target valve closure timing IVC being calculated in such a manner that the target intake air quantity which meets with a target engine torque which corresponds to an engine driving condition determined on the basis of the throttle position TAPO of the throttle valve corresponding to the manipulated variable of the accelerator and the engine speed Ne.

14. A control apparatus for an internal combustion engine as claimed in claim 13, wherein when the basic throttle position BAP is selected and the intake air negative pressure is maintained at the approximately predetermined negative pressure, the target valve closure timing IVC of the intake valve is calculated in such a manner that the valve closure timing IVC of the intake valve is varied up to a range in which the intake air quantity becomes maximum while the throttle position of the throttle valve is maintained at a closed position falling below a predetermined angular position and when the throttle position TAPO of the throttle valve corresponding to the manipulated variable of the accelerator is selected and the intake air negative pressure falls below the approximately predetermined negative pressure, the target valve closure timing IVC of the intake valve being fixed to a timing at which the intake air quantity becomes maximum and an increase in the intake air quantity is carried out through the control of the throttle position of the throttle valve.

15. A control apparatus for an internal combustion engine as claimed in claim 14, wherein the target valve closure timing IVC is fixed to the timing corresponding to a bottom dead center at a suction stroke of each cylinder of the engine.

16. A control apparatus for an internal combustion engine, comprising:
intake valve actuating means for actuating an intake valve installed to open and close each corresponding combustion chamber of the engine;
throttle valve controlling means for controlling the throttle position of the throttle valve in such a manner that an intake pressure downstream of the throttle valve is maintained constant at an approximately predetermined negative pressure value under a predetermined engine load condition; and
intake valve controlling means, including an electromagnetically powered valve drive, for controlling a valve closure timing of the intake valve indicative of the target intake air value to regulate an intake air quantity supplied to the engine via the intake valve actuating means to a target intake air value under the predetermined engine load condition, wherein the valve closure timing of the intake valve is calculated based on an engine speed and an accelerator depression.

17. A method for controlling an intake air quantity of an internal combustion engine, comprising:
controlling a throttle position of a throttle valve installed in an intake system of the engine in such a manner that an intake pressure downstream of the throttle valve is maintained constant at an approximately predetermined negative pressure value under a predetermined engine load condition; and
controlling a valve closure timing of at least one intake valve installed to open and close each corresponding combustion chamber of the engine using an electromagnetically powered valve drive to regulate an intake air quantity supplied to the engine under the predetermined engine load condition to a target intake air value, wherein the valve closure timing of the intake valve indicative of the target intake air value is calculated based on an engine speed and an accelerator depression.

18. A method for controlling an intake air quantity of an internal combustion engine as claimed in claim 17, wherein the valve closure timing under the predetermined low engine load condition is set earlier with increasing the accelerator depression depth in a case that the intake valve is closed after a bottom dead center of a suction stroke.

19. A method for controlling an intake air quantity of an internal combustion engine as claimed in claim 17, wherein the step of controlling the valve closure timing further comprises the step of determining a target valve closure timing for the at least one intake valve which meets a target intake air value, based on the engine speed and the accelerator depression and controlling the closure timing of the at least one intake valve so as to agree with the target intake air value and therefore control the amount of intake air to the target intake air value.

20. A control apparatus for an internal combustion engine, comprising:
a throttle valve installed in an intake air passage;
an intake valve controlling fluid communication between a combustion chamber and the intake air passage;
a sensor detecting an engine speed;
an accelerator sensor detecting an accelerator depression depth;
a throttle valve controller that controls a throttle position of the throttle valve in a such manner that an intake pressure is maintained constant at an approximately predetermined pressure value under a predetermined low engine load condition; and
an intake valve controller that controls a valve closure timing of the intake valve under the predetermined low engine load condition, said intake valve controller calculating a target intake valve closure timing based on the engine speed and the accelerator depression depth so as to meet a target intake air quantity, and controlling the intake valve closure timing to the target intake valve closure timing so that an intake air quantity supplied to the combustion chamber is regulated to the target intake air quantity.

21. A control apparatus for an internal combustion engine as claimed in claim 20, wherein the intake valve controller varies the valve closure timing up to a timing that the intake air quantity becomes maximum under the predetermined low engine load condition, and wherein the intake valve controller controls the valve closure timing so as to be maintained at a timing that the intake air quantity becomes maximum while the throttle valve controller controls the throttle position so as to regulate the intake air quantity under a condition other than the predetermined low engine load condition.

22. A control apparatus for an internal combustion engine as claimed in claim 20, wherein the throttle valve is electrically actuated by a throttle valve actuator and the intake valve is electromagnetically actuated by an intake valve actuator.

23. A control apparatus for an internal combustion engine as claimed in claim 20, wherein the valve closure timing under the predetermined low engine load condition is set earlier with decreasing the accelerator depression depth in a case that the intake valve is closed before a bottom dead center of a suction stroke.

24. A control apparatus for an internal combustion engine as claimed in claim 23, wherein the valve closure timing under the predetermined low engine load condition is set earlier with increasing the engine speed.

25. A control apparatus for an internal combustion engine as claimed in claim 20, wherein the valve closure timing under the predetermined low engine load condition is set earlier with increasing the accelerator depression depth in a case that the intake valve is closed after a bottom dead center of a suction stroke.

26. A control apparatus for an internal combustion engine, comprising:
   a throttle valve installed in an intake air passage;
   an intake valve to open and close a combustion chamber, the combustion chamber communicated with the intake air passage through the intake valve;
   an accelerator sensor to detect an accelerator depression depth APO; and
   a controller to calculate a throttle position TAPO corresponding to the accelerator depression depth APO, calculate a basic throttle position BAP according to the throttle position TAPO, select a larger one of the basic throttle position BAP and the throttle position TAPO as a target throttle position TTPO, control the throttle valve to the target throttle position TTPO, calculate a target valve closure timing IVC of the intake valve according to the accelerator depression depth APO, and control the intake valve to the target closure timing IVC,
      wherein an intake pressure is maintained constant at an approximately predetermined pressure value and the target valve closure timing IVC is set corresponding to a target intake quantity, under a condition that the basic throttle position BAP is selected.

27. A control apparatus for an internal combustion engine as claimed in claim 26, wherein the controller calculates the throttle position TAPO as a sum of the accelerator depression depth APO and an engine idling speed control component ISC.

28. A control apparatus for an internal combustion engine as claimed in claim 27, wherein the engine idling speed control component ISC is calculated according to a feedback control value of the idling speed control and an engine accessory load correction value when the engine is in the engine idling condition, and wherein the engine idling speed control component ISC is calculated according to either larger one of a sum of a feedback correction value, an engine accessory load correction value, and a dash pot correction value, or a boost control value component BCV which sets the intake pressure equal to or below an approximately predetermined negative pressure when the engine is in an engine non-idling condition.

29. A control apparatus for an internal combustion engine as claimed in claim 26, further comprising a sensor detecting an engine speed Ne, wherein the basic throttle position BAP is calculated on the basis of the throttle position TAPO and the engine speed Ne.

30. A control apparatus for an internal combustion engine as claimed in claim 26, wherein the target throttle position TTPO is calculated as an addition of the basic throttle position BAP and a learning value TAS on operations of the throttle valve position when the basic throttle position BAP is selected, and wherein the target throttle position TTPO is calculated as an addition of the throttle position TAPO and the learning value TAS when the throttle position TAPO is selected.

31. A control apparatus for an internal combustion engine as claimed in claim 26, further comprising a sensor detecting an engine speed Ne, wherein the target valve closure timing IVC is calculated according to the throttle position TAPO and the engine speed Ne.

32. A control apparatus for an internal combustion engine as claimed in claim 26, wherein the target valve closure timing IVC is varied up to a timing that the intake air quantity becomes maximum when the basic throttle position BAP is selected, and wherein the target valve closure timing IVC is fixed at a timing that the intake air quantity becomes maximum and an increase in the intake air quantity is carried out through the control of the throttle position when the throttle position TAPO is selected.

33. A control apparatus for an internal combustion engine as claimed in claim 32, wherein the target valve closure timing IVC is fixed to a bottom dead center of a suction stroke when the throttle position TAPO is selected.

34. A control apparatus for an internal combustion engine, comprising:
   means for detecting an accelerator depression depth of an accelerator pedal;
   means for detecting an engine speed;
   a throttle valve control means for controlling a throttle position of a throttle valve in a manner such that an intake pressure is maintained constant at an approximately predetermined pressure value under a predetermined low engine load condition; and
   an intake valve control means for calculating a target intake valve closure timing based on the detected engine speed and the detected accelerator depression which meets a target intake air quantity and for controlling a valve closure timing of an intake valve under the predetermined low engine load condition in accordance with the target intake valve closure timing so that an intake air quantity supplied to a combustion chamber is regulated to the target intake air quantity.

35. A control apparatus for an internal combustion engine as claimed in claim 34, wherein the valve closure timing is varied up to a timing that the intake air quantity becomes maximum under the predetermined low engine load condition, and wherein the valve closure timing is maintained at a timing that the intake air quantity becomes maximum while the throttle position is controlled to regulate the intake air quantity under a condition other than the predetermined low engine load condition.

36. A control apparatus for an internal combustion engine as claimed in claim 34, wherein the valve closure timing under the predetermined low engine load condition is set earlier with decreasing the accelerator depression depth in a case that the intake valve is closed before a bottom dead center of a suction stroke.

37. A control apparatus for an internal combustion engine as claimed in claim 36, wherein the valve closure timing under the predetermined low engine load condition is set earlier with increasing the engine speed.

38. A control apparatus for an internal combustion engine as claimed in claim 34, wherein the valve closure timing under the predetermined low engine load condition is set earlier with increasing the accelerator depression depth in a case that the intake valve is closed after a bottom dead center of a suction stroke.

39. A method for controlling an intake air quantity of an internal combustion engine, comprising:
   controlling a throttle position of a throttle valve in a such manner that an intake pressure is maintained constant at an approximately predetermined pressure value under a predetermined low engine load condition;

calculating a target intake valve closure timing based on an engine speed and an accelerator depression depth which meets a target intake air quantity; and controlling a valve closure timing of an intake valve under the predetermined low engine load condition to the target intake valve closure timing so that an intake air quantity supplied to a combustion chamber is regulated to the target intake air quantity.

40. A method for controlling an intake air quantity of an internal combustion engine as claimed in claim 39, wherein the valve closure timing is varied up to a timing that the intake air quantity becomes maximum under the predetermined low engine load condition, and wherein the valve closure timing is maintained at a timing that the intake air quantity becomes maximum while the throttle position is controlled to regulate the intake air quantity under a condition other than the predetermined low engine load condition.

41. A method for controlling an intake air quantity of an internal combustion engine as claimed in claim 39, wherein the valve closure timing under the predetermined low engine load condition is set earlier with decreasing the accelerator depression depth in a case that the intake valve is closed before a bottom dead center of a suction stroke.

42. A method for controlling an intake air quantity of an internal combustion engine as claimed in claim 41, wherein the valve closure timing under the predetermined low engine load condition is set earlier with increasing the engine speed.

* * * * *